S. O. WHITE & W. W. PECK.
STEERING WHEEL.
APPLICATION FILED MAY 1, 1916.
1,204,724.
Patented Nov. 14, 1916.
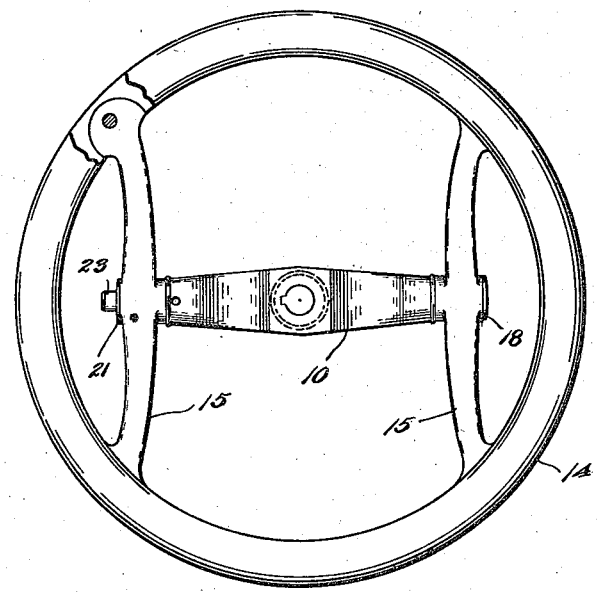
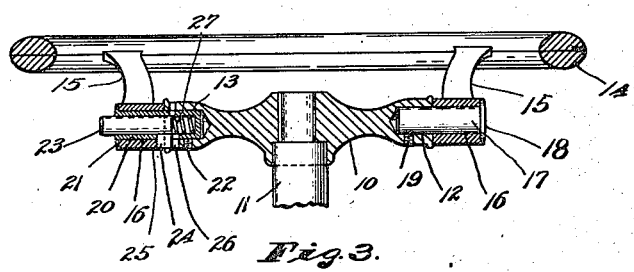
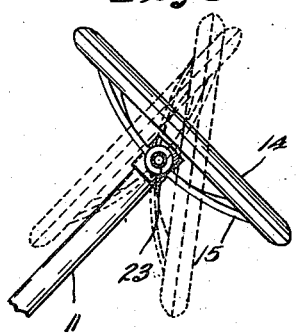
WITNESSES:
INVENTORS
Samuel O. White,
William W. Peck,
BY
ATTORNEYS

UNITED STATES PATENT OFFICE.

SAMUEL O. WHITE AND WILLIAM W. PECK, OF MUNCIE, INDIANA, ASSIGNORS TO WARNER GEAR COMPANY, OF MUNCIE, INDIANA, A CORPORATION OF INDIANA.

STEERING-WHEEL.

1,204,724. Specification of Letters Patent. Patented Nov. 14, 1916.

Application filed May 1, 1916. Serial No. 94,544.

*To all whom it may concern:*

Be it known that we, SAMUEL O. WHITE and WILLIAM W. PECK, citizens of the United States, residing at Muncie, in the county of Delaware and State of Indiana, have invented a new and useful Steering-Wheel, of which the following is a specification.

The object of our invention is to produce a substantial steering wheel construction, of that type in which the wheel proper may be swung from normal to abnormal position, in order to give greater freedom of movement of the driver to and from an automobile.

The accompanying drawings illustrate our invention.

Figure 1 is a plan, with a small section of the rim broken away; Fig. 2 an axial section; and Fig. 3 an elevation, on a smaller scale.

In the drawings, 10 indicates a cross head which is designed at its middle for application to the upper end of any ordinary steering shaft 11.

At its diametrically opposite ends the cross head 10 is provided with sockets 12 and 13 which are in alinement with each other and at right angles to the central bore of the cross head. The rim 14 of the wheel is provided with a pair of brackets 15, 15 which are substantially parallel with each other and form chords of about 90° of the rim 14. Each of the brackets 15 is provided at its middle with a bore 16 adapted to aline with the bores 12 and 13 of the cross head 10. Projected through the bore 16 of one of the brackets 15 is a pin 17 provided at its outer end with a head 18 which serves to engage the adjacent bracket. At its inner end the pin 17 is projected into bore 12 and is held in place by a set screw 19. Projected through the bore 16 of the other bracket 15 is a hollow pin 20 provided at its outer end with a head 21 which engages the adjacent bracket 15, and at its inner end is projected into the bore 13 and held in place by a set screw 22. Mounted in the hollow pin 20 is a push button or rod 23 which is provided at its inner end with a key 24 which is projected radially through a slot formed in the wall of the hollow pin 20 and is adapted, when in the position shown in Fig. 2, to engage a notch 25 formed in the inner end of the hub or central portion of the adjacent bracket 15. The key 24 also lies in a notch 26 formed in the outer adjacent end of the cross head 10. Pin 23 is normally projected to the position shown in Fig. 2 by a light spring 27 which is mounted within the tubular pin 20. With the steering wheel in normal position, key 24 lies in notch 25 of the adjacent bracket 15 and thus holds the wheel in operative position. When it is desired to obtain greater room in order to permit the driver to move into or out of the driver's seat, the pin 23 will be pushed inwardly so as to retract key 24 from notch 25, whereupon, the wheel may be tilted in either direction, although preferably to the position shown in dash lines in Fig. 3. When the wheel is swung back to its normal position, the key 24 will be automatically caused to spring into the notch 25 and lock the parts in operative position. Push pin 23 is within easy reach of the fingers of the driver and may be very easily manipulated.

It will be seen from the above that our structure is so simple that it may be cheaply manufactured and it will also be seen that, because the fastening mechanism is arranged axially within the structure, there will be no projecting hooks, levers or fingers to catch upon clothing. It will also be noted that the axial mounting of the fastening means places the push pin 23 in the most convenient position for operation.

We claim as our invention:

1. A steering wheel for automobiles comprising a cross head designed for attachment to a steering shaft, a pair of brackets pivotally supported upon the outer ends of said cross head, one of said pivotal supports being axially bored, a rim carrying said brackets, and a locking pin mounted in said axial bore and forming a retractable lock between the cross head and one of said brackets.

2. A steering wheel for automobiles comprising a cross head designed for attachment to a steering shaft and provided at its ends with diametrically opposed sockets, a pair of brackets having bores in alinement with said sockets, a rim carrying said brackets, a pair of pivot pins projected through said brackets into the cross head sockets, one of said pins being hollow, and a locking pin mounted in said hollow pivot pin for engaging and holding the adjacent bracket in operative position.

3. A steering wheel for automobiles comprising a cross head designed for attachment to a steering shaft, a rim, pivotal connections between said rim and the opposite ends of the cross head, one of said pivotal connections being axially bored, and a locking member arranged within said bore.

In witness whereof, we have hereunto set our hands at Muncie, Indiana, this 27th day of April, A. D. one thousand nine hundred and sixteen.

SAMUEL O. WHITE.
WILLIAM W. PECK.